(12) United States Patent  (10) Patent No.: US 6,915,143 B2
Kashu et al.  (45) Date of Patent: Jul. 5, 2005

(54) PORTABLE TELEPHONE

(75) Inventors: Hiroomi Kashu, Moriguchi (JP); Shuji Otsuka, Higashiosaka (JP); Hideji Kawasaki, Neyagawa (JP); Takenori Ugari, Hirakata (JP)

(73) Assignee: Sanyo Electric Co., Ltd., Moruguchi (JP)

( * ) Notice: Subject to any disclaimer, the term of this patent is extended or adjusted under 35 U.S.C. 154(b) by 601 days.

(21) Appl. No.: 09/922,834

(22) Filed: Aug. 7, 2001

(65) Prior Publication Data

US 2002/0019249 A1 Feb. 14, 2002

(30) Foreign Application Priority Data

Aug. 10, 2000 (JP) ........................................ 2000-242442

(51) Int. Cl.[7] ................................................ H04M 1/00
(52) U.S. Cl. ................... 455/560; 455/574; 455/343.1; 455/566; 455/563; 345/170; 345/176; 345/102
(58) Field of Search ................................ 455/566, 563, 455/422.1, 462, 560, 574, 343.2, 343.3; 345/170, 176, 84, 87, 94, 102, 173

(56) References Cited

U.S. PATENT DOCUMENTS

| | | | | |
|---|---|---|---|---|
| 5,526,403 A | * | 6/1996 | Tam | 455/426.1 |
| 5,970,419 A | * | 10/1999 | Terashima et al. | 455/566 |
| 6,272,360 B1 | * | 8/2001 | Yamaguchi et al. | 455/569.2 |
| 6,317,614 B1 | * | 11/2001 | Okada | 455/574 |
| 6,426,736 B1 | * | 7/2002 | Ishihara | 345/102 |
| 6,529,747 B1 | * | 3/2003 | Toba | 455/563 |

* cited by examiner

*Primary Examiner*—Nick Corsaro
*Assistant Examiner*—Shaima Q Aminzay
(74) *Attorney, Agent, or Firm*—Armstrong, Kratz, Quintos, Hanson & Brooks, LLP.

(57) ABSTRACT

A portable telephone of the present invention comprises a casing, a LCD 18 and a key input device 20 disposed on a surface of the casing. The casing has a microphone 17 for delivering speech, a speaker 16 for receiving speech, a backlight 19 for lighting a screen of the LCD 18, a key light device 21 for lighting a manipulation surface of the key input device 20, and a control circuit 15 incorporated therein. The control circuit 15 checks whether a speech delivery signal input from the microphone 17 is a voice signal. If the speech delivery signal is a voice signal, display operation of the LCD 18 is set to OFF and both the backlight 19 and the key light device 21 are turned off. If the signal is not a voice signal, display operation of the LCD 18 is set to ON. Consequently, useless power consumption is reduced.

6 Claims, 7 Drawing Sheets

PORTABLE TELEPHONE

FIELD OF THE INVENTION

The present invention relates to portable telephones comprising a portable casing which is provided with a microphone for speech delivery, a speaker for speech receiving, a display for showing information, and a control circuit for controlling display operation.

BACKGROUND OF THE INVENTION

A portable telephone, for example, as shown in FIG. 8, has a flat casing 3 comprising the combination of a front case 31 and a rear case 32, and is provided with an antenna 33 on a head portion of the casing 3.

Disposed on a surface of the front case 31 are a key input device 34 having a plurality of manual keys and a LCD (Liquid Crystal Display) 35. Provided respectively on a upper and a lower end portions of the surface are a speech receiving portion 36 incorporating a speaker and a speech delivery portion 37 incorporating a microphone. When the manual keys of the key input device 34 are manipulated, information such as characters, etc. input by the manipulation is displayed on the LCD 35. When a voice call or an electronic mail is received, a telephone number or a name of a caller or a sender is displayed on the LCD 35. In a call waiting state, information like date or a present time is displayed on the LCD.

The casing 3 has a key light device (not shown) for lighting a manipulation surface of the key input device 34 and a backlight (not shown) for lighting a screen surface of the LCD 35 incorporated therein. When the manual key of the key input device 34 is manipulated or when a voice call is received or when an electronic mail is received, the key light device and the backlight are turned on for a predetermined period of time, e.g., 10 seconds. The key light device and the backlight are turned on for a predetermined period of time only when the manual key is manipulated, or the voice call is received, or the electronic mail is received, so that power consumption can be saved.

However, with the conventional portable telephones, when a user keeps a handset over his ear while calling, he does not look at a screen of the LCD 35. Display operation of the LCD 35, though, is always actuated to waste useless power. This entails the problem of shortening not only the battery life of the secondary battery but also standby time and continuous talktime.

Particularly, in recent years, portable telephones comprising a TFT liquid crystal display instead of a conventional STN liquid crystal display have appeared on the market. With the portable telephones of this type having a TFT LCD, there arises the distinctive problem of shorter battery life, shorter standby time, and shorter continuous talktime since the TFT LCD is greater than STN LCD in power consumption.

SUMMARY OF THE INVENTION

An object of the present invention is to provide a portable telephone which is adapted to reduce useless power consumption.

The portable telephone embodying the invention has a portable casing which is provided with a microphone for speech delivery, a speaker for speech receiving, a display for showing information, and a control circuit for controlling display operation. The control circuit comprises:

checking means for checking whether a speech delivery signal input from the microphone and/or a speech receiving signal to be fed to the speaker are voice signals, display on/off control means for setting display operation to OFF when the signal is found to be a voice signal, while setting display operation to ON when the signal is not found to be a voice signal.

When a user speaks with the portable telephone kept over the user's ear, a voice signal of the user is input as a speech delivery signal from the microphone. On the other hand, when a user keeps the portable telephone off the user's ear, a noise signal from the user's surroundings is input as a speech delivery signal from the microphone.

When a voice signal of a caller with whom the user is talking is fed to the speaker as a speech receiving signal, it is highly possible that the user keeps the portable telephone over the user's ear. On the other hand, when a noise signal from the caller's surroundings is fed to the speaker as a speech receiving signal, it is highly possible that the user keeps the portable telephone off the user's ear.

Accordingly, when a speech delivery signal input from the microphone or a speech receiving signal to be fed to the speaker is a voice signal, it is highly possible that the user keeps the portable telephone over the user's ear.

As described above, when the user keeps the portable telephone over the user's ear, the user will not look at the display screen, so that display operation of the display needs not to be turned on.

With the portable telephone of the invention, an inquiry is made as to whether a speech delivery signal input from the microphone and/or a receiving signal fed to the speaker are voice signals. When the answer is affirmative, display operation of the display is set to OFF. When the answer is negative, display operation of the display is set to ON.

With the portable telephone of the invention, display operation of the display is set to OFF when display operation of the display needs not to be set to ON, so that useless power consumption can be more reduced than the conventional portable telephone wherein a display is always set to ON.

According to the first specific construction, the checking means of the control circuit checks whether the speech delivery signal and/or the speech receiving signal are voice signals based on a sound pressure value or a waveform amplitude value of the speech delivery signal and/or the speech receiving signal.

Stated specifically, the checking means of the control circuit comprises:

storing means for storing a reference value of the sound pressure value or the waveform amplitude value of the voice signal used for checking whether the speech delivery signal input from the microphone and/or the speech receiving signal fed to the speaker are voice signals, detecting means for detecting the sound pressure value or the waveform amplitude value of the speech delivery signal input from the microphone and/or the speech receiving signal to be fed to the speaker, and signal checking means for checking whether the speech delivery signal and/or the speech receiving signal are voice signals by comparing the reference value stored in the storing means with the sound pressure value or the waveform amplitude value detected according to the detecting means.

In the case where a speech delivery signal input from the microphone and/or a speech receiving signal to be fed to the speaker are voice signals, a sound pressure value or a waveform amplitude value of the speech delivery signal and/or the speech receiving signal is greater than in the case where a speech delivery signal and/or a speech receiving signal are surrounding noise signals.

By comparing a reference value of a sound pressure value or a waveform amplitude value of a voice signal with a sound pressure value or a waveform amplitude value detected, the signal checking means checks whether a speech delivery signal and/or a speech receiving signal are voice signals.

Stated specifically, when the sound pressure value or the waveform amplitude value detected by the detecting means is continuously or intermittently greater than the reference value described for a longer period of time than a specified period of time, the signal checking means checks whether the speech delivery signal and/or the speech receiving signal are voice signals.

In this specific construction, the reference value stored is a value for determining that the speech delivery signal and/or the speech receiving signal are not noise signals but voice signals.

Even if a user keeps the portable telephone off the user's ear, when noise volume surrounding the user is momentarily increased, a speech delivery signal having a sound pressure value and a waveform amplitude value increased are momentarily input to the microphone.

When noise volume surrounding a caller with whom the user is talking on the phone is momentarily increased, a sound pressure value and a waveform amplitude value of a speech receiving signal to be fed to the speaker are momentarily increased.

Only when a sound pressure value or a waveform amplitude value of a speech delivery signal input from the microphone and/or a speech receiving signal to be fed to the speaker is continuously or intermittently greater than the reference value over a predetermined period of time, the speech delivery signal and/or the speech receiving signal are found to be voice signals. Therefore, in the case described above, there is no likelihood that the speech delivery signal and/or the speech receiving signal will erroneously be found to be voice signals to set the display operation of the display to OFF.

According to the second specific construction, the checking means of the control circuit comprises;

signal analysis means for performing frequency analysis of the speech delivery signal input from the microphone and/or the speech receiving signal to be fed to the speaker, and signal checking means for checking whether the speech delivery signal and/or the speech receiving signal are voice signals based on the resulted analysis according to the signal analysis means.

A male voice signal has great frequency components within the range of 0 to 1.5 kHz, and the magnitude of the frequency component reaches a peak every 100 to 150 Hz. A female voice signal has great frequency components within the range of 0 to 2.5 kHz and the magnitude of the frequency component reaches a peak every 250 to 300 Hz. Accordingly, human voice signals have distinctive distribution characteristics of a frequency component. An inquiry is made as to whether the speech delivery signal and/or the speech receiving signal is a voice signal based on the result of the frequency analysis of a speech delivery signal input from the microphone and/or a speech receiving signal to be fed to the speaker.

Stated specifically, in a portable telephone comprising an information input device having a manipulation surface disposed on a surface of the casing, display on/off control means of the control circuit sets display operation of the display to ON when the user conducts some manipulation to the information input device.

When the user keeps the portable telephone off the user's ear, the user conducts manipulation to the information input device while looking at the screen of the display. When the user conducts some manipulation to the information input device, display operation of the display is set to ON.

Stated specifically, in the portable telephone comprising an information input device having a manipulation surface disposed on a surface of the casing and a light device for lighting a screen of the display and/or a manipulation surface of the information input device, the control circuit comprises:

light control means for turning off the light device when the speech delivery signal input from the microphone and/or the speech receiving signal to be fed to the speaker are found to be voice signals.

As described above, when the user keeps the portable telephone over the user's ear, the user will not look at the screen of the display, so that the screen of the display needs not to be lit. In this state, the user will not conduct manipulation to the information input device, whereby the manipulation surface of the information input device needs not to be lit. Therefore, when the speech delivery signal input from the microphone and/or the speech receiving signal to be fed to the speaker are found to be voice signals, the light device is caused to be turned off.

Thus, by turning off the light device in the case where the screen of the display and the manipulation surface of the information input device need not to be lit, useless power consumption can be much more reduced.

As described above, with the portable telephone of the present invention, useless power consumption can be reduced.

DETAILED DESCRIPTION OF EMBODIMENTS

Figure 8:
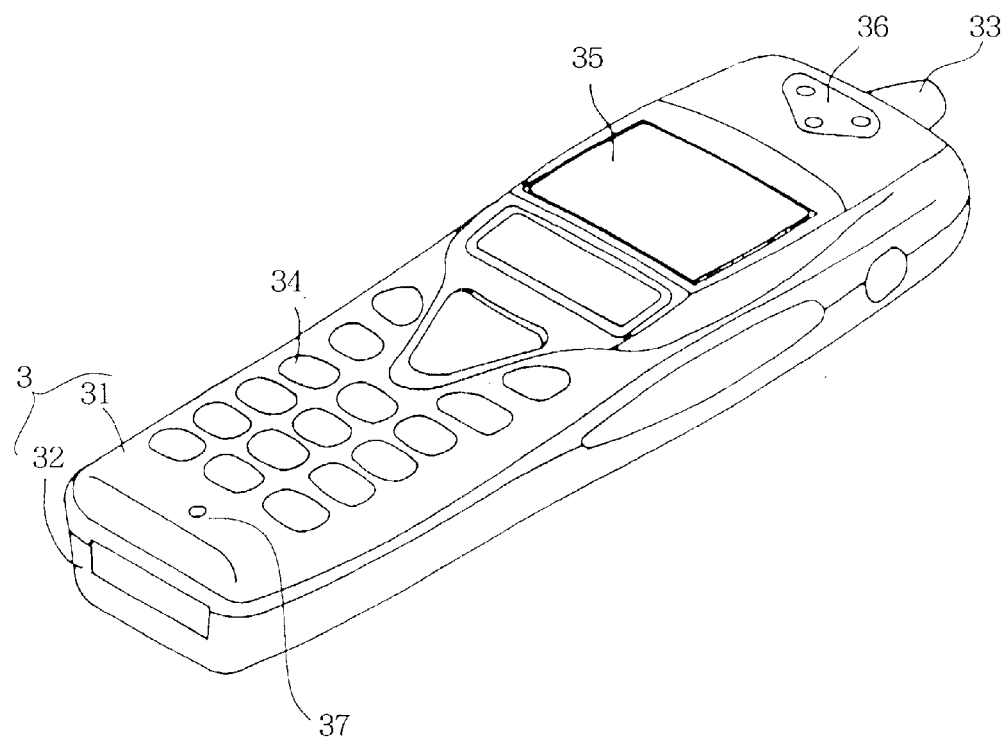
FIG. 8 is a perspective view showing the appearance of a conventional portable telephone.

The present invention will be described in detail as embodied into a portable telephone which has a flat casing comprising the combination of a front case and a rear case as a conventional telephone shown in FIG. 8, with reference to two embodiments.

First Embodiment

Figure 1:
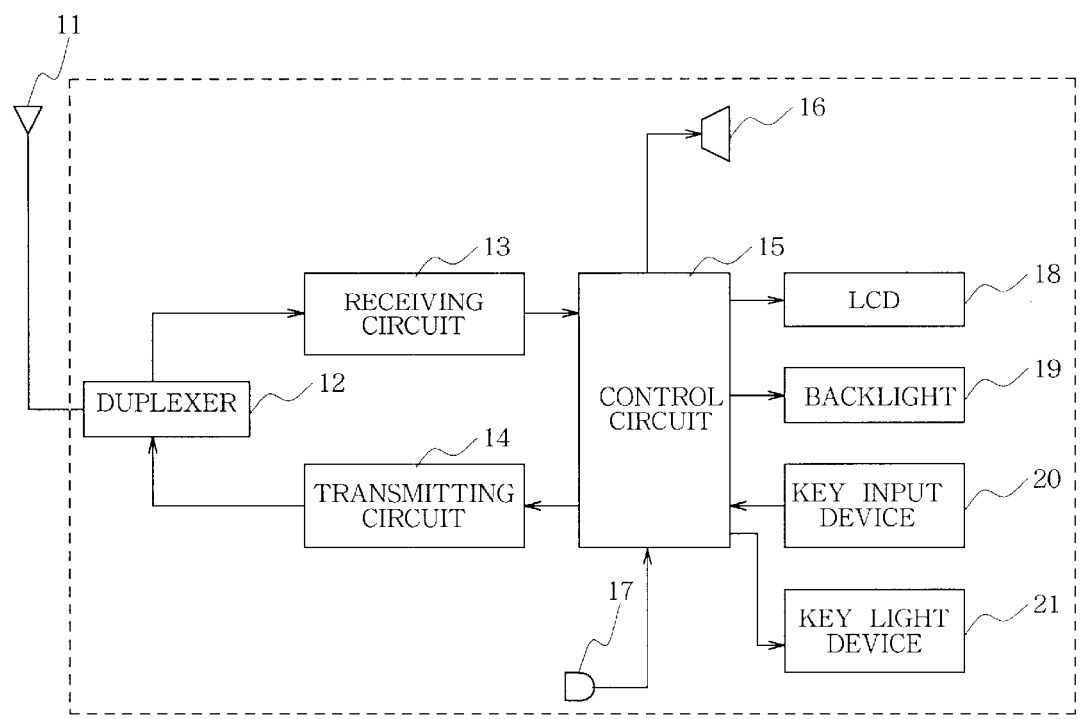
FIG. 1 is a block diagram showing the electric construction of the portable telephone of the invention.

FIG. 1 shows the electric construction of a portable telephone of the embodiment. As illustrated, a receiving circuit 13 and a transmitting circuit 14 are connected together in parallel to a duplexer 12. A signal received by an antenna 11 is fed to the receiving circuit 13 via the duplexer 12 to demodulate a speech receiving signal. The speech receiving signal is fed to a speaker 16 via a control circuit 15 to be output as sound. A speech delivery signal input to the microphone 17 is fed to the transmitting circuit 14 via the control circuit 15 to be modulated. The speech delivery signal modulated is transmitted from the antenna 11 via the duplexer 12.

The control circuit 15 is connected to a LCD 18 and to a key input device 20. The control circuit 15 is also connected to a backlight 19 for lighting a display surface of the LCD 18 and to a key light device 21 for lighting a manipulation surface of the key input device 20.

With the portable telephone of the embodiment, LCD display ON/OFF function to have the LCD 18 turned ON/OFF while communicating can be set.

When a user speaks with the telephone kept over the user's ear, a voice signal of the user is input to the microphone 17 as a speech delivery signal. On the other hand, when a user keeps the telephone off the user's ear, a noise signal surrounding the user is input to the microphone 17 as a speech delivery signal.

When a user keeps the telephone over the user's ear, as stated above, the user will not look at a screen of the LCD 18, whereby display operation of the LCD 18 needs not to be set to ON.

Display operation of the LCD 18 is ON/OFF-controlled as described below according to an answer to an inquiry as to whether the speech delivery signal input from the microphone 17 is a voice signal.

Figure 2:
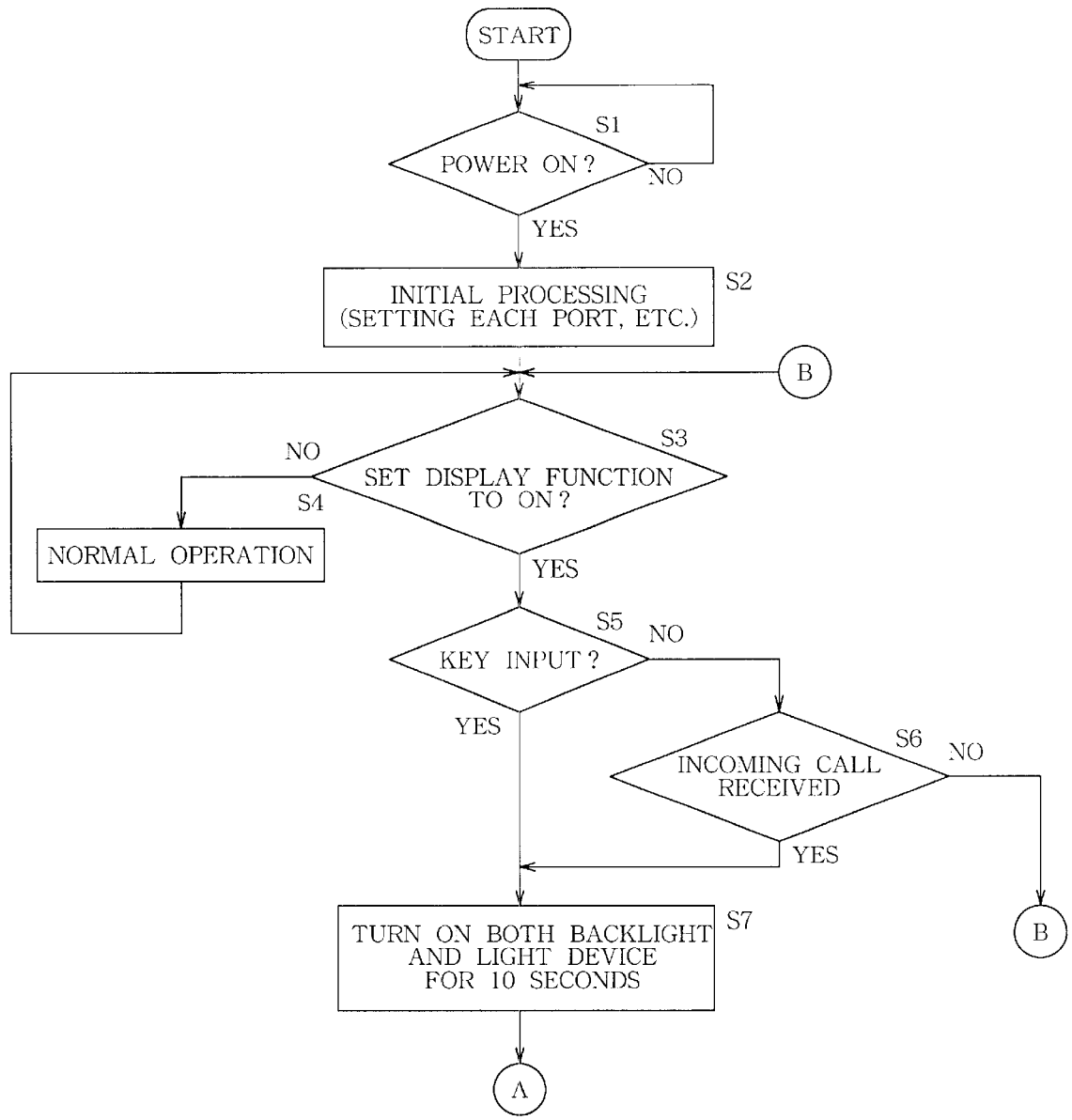
FIG. 2 is a flow chart showing the first half of LCD display ON/OFF procedure with the portable telephone of the first embodiment.
Figure 3:
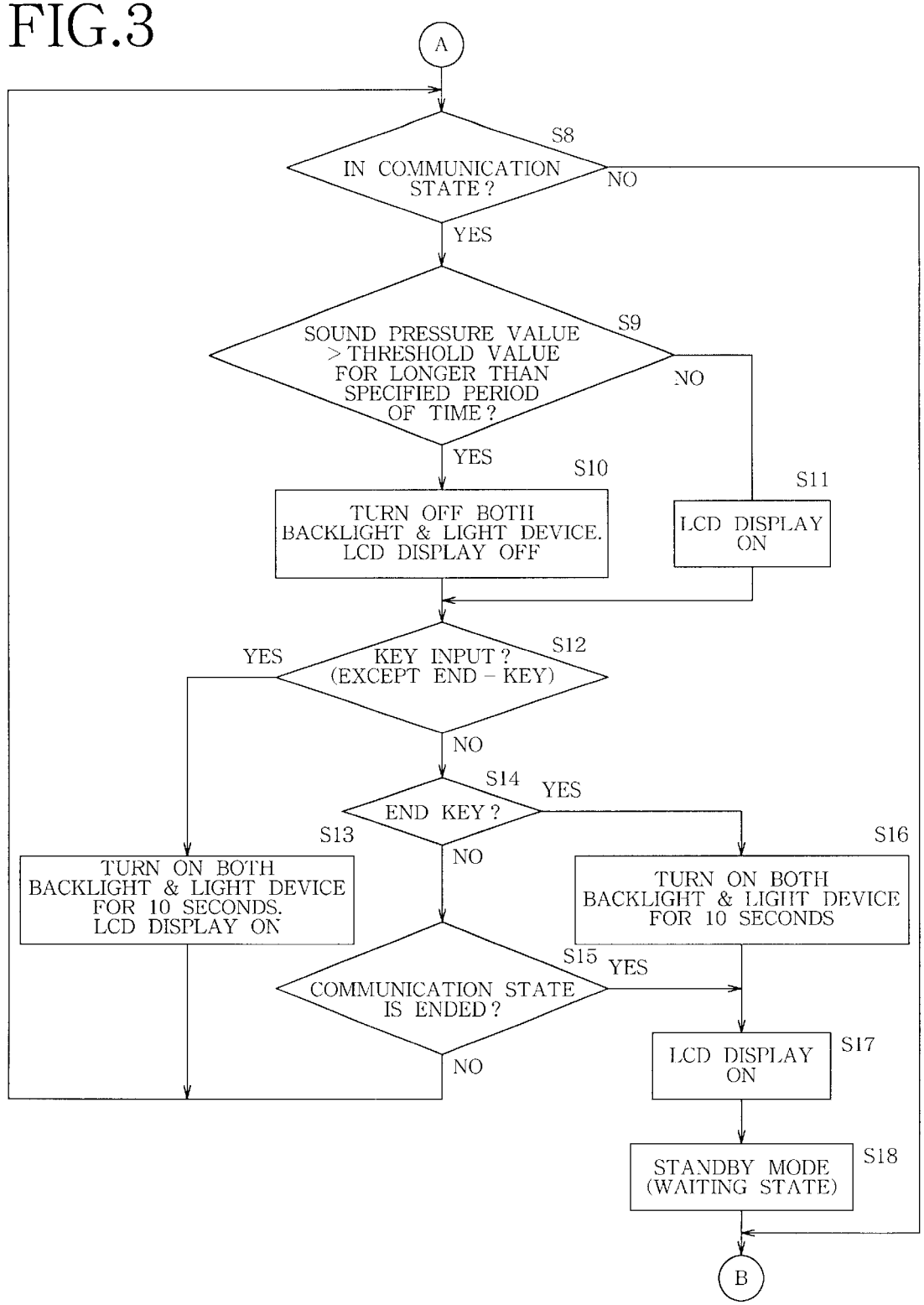
FIG. 3 is a flow chart showing the second half of the procedure described above.

FIG. 2 and FIG. 3 show LCD display ON/OFF procedure to be executed by the control circuit 15.

In step S1 as shown in FIG. 2, an inquiry is made as to whether power is turned ON. If the answer is negative, step S1 follows again to repeat the same inquiry. If the answer is affirmative, an initial processing including setting each port, etc. is executed in step S2. Subsequently, step S3 inquires whether LCD display ON/OFF function is set to ON. If the answer is negative, step S4 follows to execute normal operation.

On the other hand, if the inquiry is answered in the affirmative in step S3, step S5 follows to inquire whether any manual key of the key input device 20 performs key input. If the answer is negative, step S6 follows to inquire whether a incoming call is received. When the answer is negative, step S3 follows again to repeat the inquiry as to whether display ON/OFF function is set to ON.

When the answer is affirmative in step S5 with the manipulation of inputting a telephone number, preparing a text message, and key-inputting like selecting a function etc., and when in step S6 the answer is affirmative in receiving a voice call or a message, step S7 follows to execute operation for lighting both the backlight 19 and the key light device 21 for just 10 seconds.

Next in step S8 as described in FIG. 3, an inquiry is made as to whether the telephone is in a communication state. When the answer is negative, step S3 shown in FIG. 2 follows again to repeat the inquiry whether display ON/OFF function is set to ON.

On the other hand, when the answer is affirmative in step S8 as described in FIG. 3, step S9 follows to inquire whether a sound pressure value of the speech delivery signal input by the microphone 17 is kept greater than a predetermined threshold value for a longer period of time than a specified period of time. In the case where the speech delivery signal input from the microphone 17 is a voice signal, the sound pressure value of the speech delivery signal is greater than in the case where the speech delivery signal is a surrounding noise signal. If the noise signal becomes momentarily great, a speech delivery signal having a great sound pressure value is momentarily input to the microphone 17. Thus, the threshold value set is a value for determining that the speech delivery value input from the microphone 17 is not the noise signal but the voice signal. It is checked whether the speech delivery signal is a voice signal depending on whether the sound pressure value of the speech delivery signal is kept greater than the threshold value for a longer period of time than a specified period of time.

When in step S9 the answer is answered in the affirmative, step S10 follows to turn off both the backlight 19 and the key light device 21, and to set display operation of the LCD 18 to OFF and thereafter followed by step S12. On the other hand, when in step S9 the answer is answered in the negative, step S11 follows to set display operation of the LCD 18 to ON and thereafter, followed by step S12.

In step S12, an inquiry is made as to whether key input is performed by a manual key except an end-key having on-hook function. When the answer is affirmative, step S13 follows to perform operation for lighting both the backlight 19 and the key light device 21 for just 10 seconds to set display operation of the LCD 18 to ON. Thereafter, step S8 follows again to repeat the inquiry as to whether the telephone is in a communication state.

When the answer is negative in step S12, step S14 follows to inquire whether the end-key is manipulated. If the answer is negative, step S15 follows to inquire whether the communication is ended. If the answer is negative in step S15, step S8 follows to repeat the inquiry as to whether the telephone is in a communication state. If the answer is affirmative in step S15, step S17 follows.

If the answer is affirmative in step S14 with the end-key manipulated, step S16 follows to perform operation for lighting both the backlight 19 and the key light device 21 for just 10 seconds and then step S17 follows.

In step S17, display operation of the LCD 18 is set to ON. Subsequently, in step S18, the telephone is set to a standby mode or a call waiting state, and then step S3 as described in FIG. 2 follows again.

When the user speaks with the portable telephone of the invention kept over the user's ear while the telephone is in a communication state, a voice signal of the user is input from the microphone 17 as the speech delivery signal, as described above. The answer to the inquiry in step S9 is affirmative as in FIG. 3 to turn off both the backlight 19 and the key light device 21, setting display operation of the LCD 18 to OFF.

On the other hand, when the user keeps the telephone off the user's ear, a surrounding noise signal is input from the microphone 17 as a speech delivery signal. The answer to the inquiry in step S9 is negative to set display operation of the LCD 18 to ON.

If the user manipulates the manual key except the end-key while the telephone is in a communication state, the answer to the inquiry in step S12 is affirmative to turn on both the backlight 19 and the key light device 21, setting display operation of the LCD 18 to ON.

If the user manipulates the end-key while the telephone is in a communication state, the answer to the inquiry in step S14 is affirmative to turn on both the backlight 19 and the key light device 21, setting display operation of the LCD 18 to ON. Thereafter, the telephone is set in the standby mode.

Further, in the case where a caller with whom a user is talking manipulates to end the communication while the user does not manipulate the end-key, the answer to the inquiry in step S16 is affirmative, to set display operation of the LCD 18 to ON, thereafter setting the telephone in the standby mode.

With the portable telephone of the embodiment, when display operation of the LCD 18 needs not to be set to ON, i.e., when the user speaks with the telephone kept over the user's ear, display operation of the LCD 18 is caused to be set to OFF. Further, if the user speaks within 10 seconds after both the backlight 19 and the key light device 21 are turned on, both the backlight 19 and the key light device 21 are forced to be turned off. Consequently, with the portable telephone of the embodiment, useless power consumption is more reduced than the conventional portable telephone wherein a display is always set to ON and both the backlight and the key light device are always kept turned on for just 10 seconds.

With the portable telephone of the embodiment, only when sound pressure value of the speech delivery signal is kept greater than the threshold value for a longer period of time than a specified period of time, display operation of the LCD 18 is set to OFF and both the backlight 19 and the key light device 21 are turned off, so that in the case where a surrounding noise signal is momentarily great when the user keeps the telephone off the user's ear, there is no likelihood that the speech delivery signal will be erroneously found to be a voice signal to set display operation of the LCD 18 to OFF.

Second Embodiment

The portable telephone incorporating this embodiment has the same electrical construction as the portable telephone according to the first embodiment with the exception of the control circuit as shown in FIG. 1.

Whereas the control circuit 15 of the first embodiment inquires whether a speech delivery signal is a voice signal based on a sound pressure value of the speech delivery signal input from the microphone, a control circuit of this embodiment performs frequency analysis of a speech delivery signal input from the microphone 17, and inquires whether the speech delivery signal is a voice signal based on the resulted frequency analysis.

Figure 4:
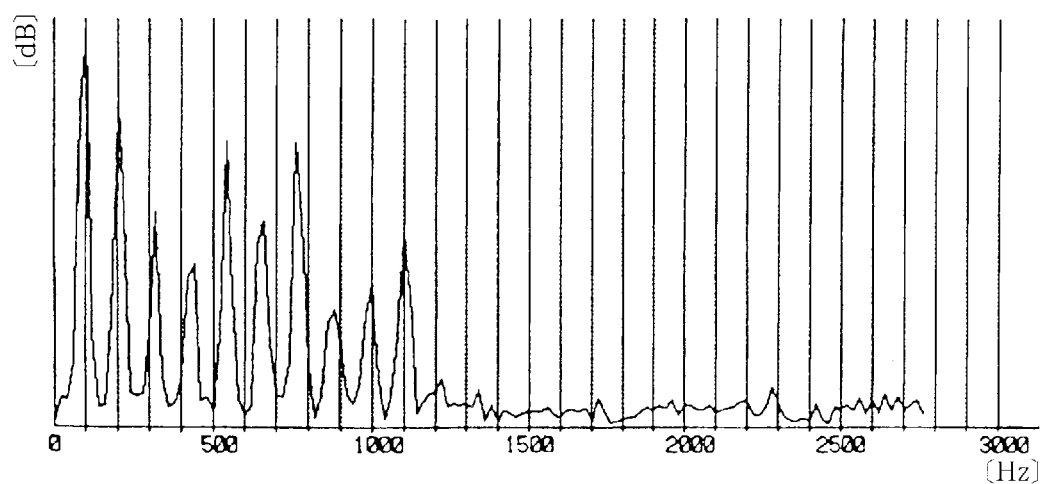
FIG. 4 is a graph showing frequency components distribution of a male voice signal.
Figure 5:
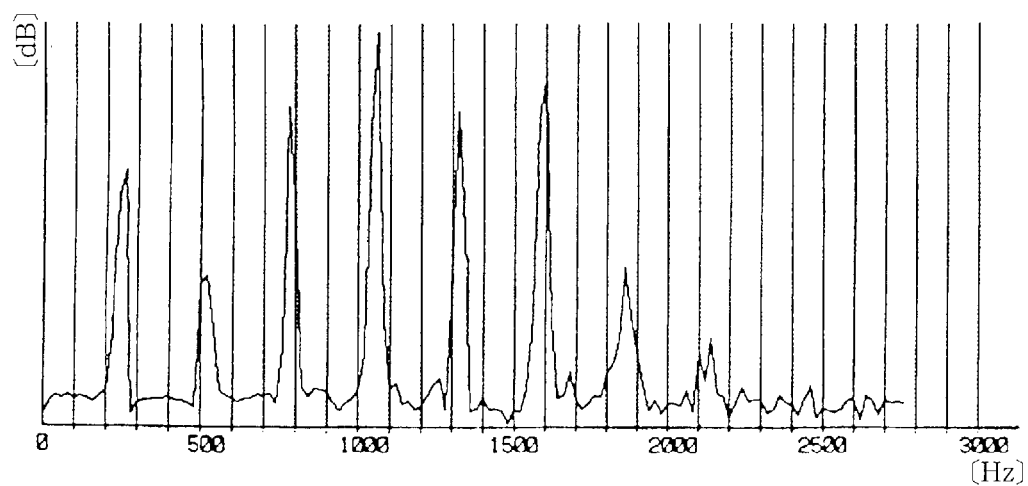
FIG. 5 is a graph showing frequency components distribution of a female voice signal.

FIG. 4 shows distribution characteristics of frequency components of male voice signals. FIG. 5 shows distribution characteristics of frequency components of female voice signals.

A male voice signal, as shown in FIG. 4, has great frequency components within the range of 0 to 1.5 kHz, and the magnitude of the frequency component reaches a peak every 100 to 150 Hz. A female voice signal has great frequency components within the range of 0 to 2.5 kHz as shown in FIG. 5, and the magnitude of the frequency component reaches a peak every 250 to 300 Hz. Accordingly, male and female voice signals have distinctive distribution characteristics of frequency components, respectively.

The control circuit of this embodiment performs frequency analysis of the speech delivery signal input from the microphone 17, and inquires whether the speech delivery signal is a voice signal based on the resulted analysis.

Figure 6:
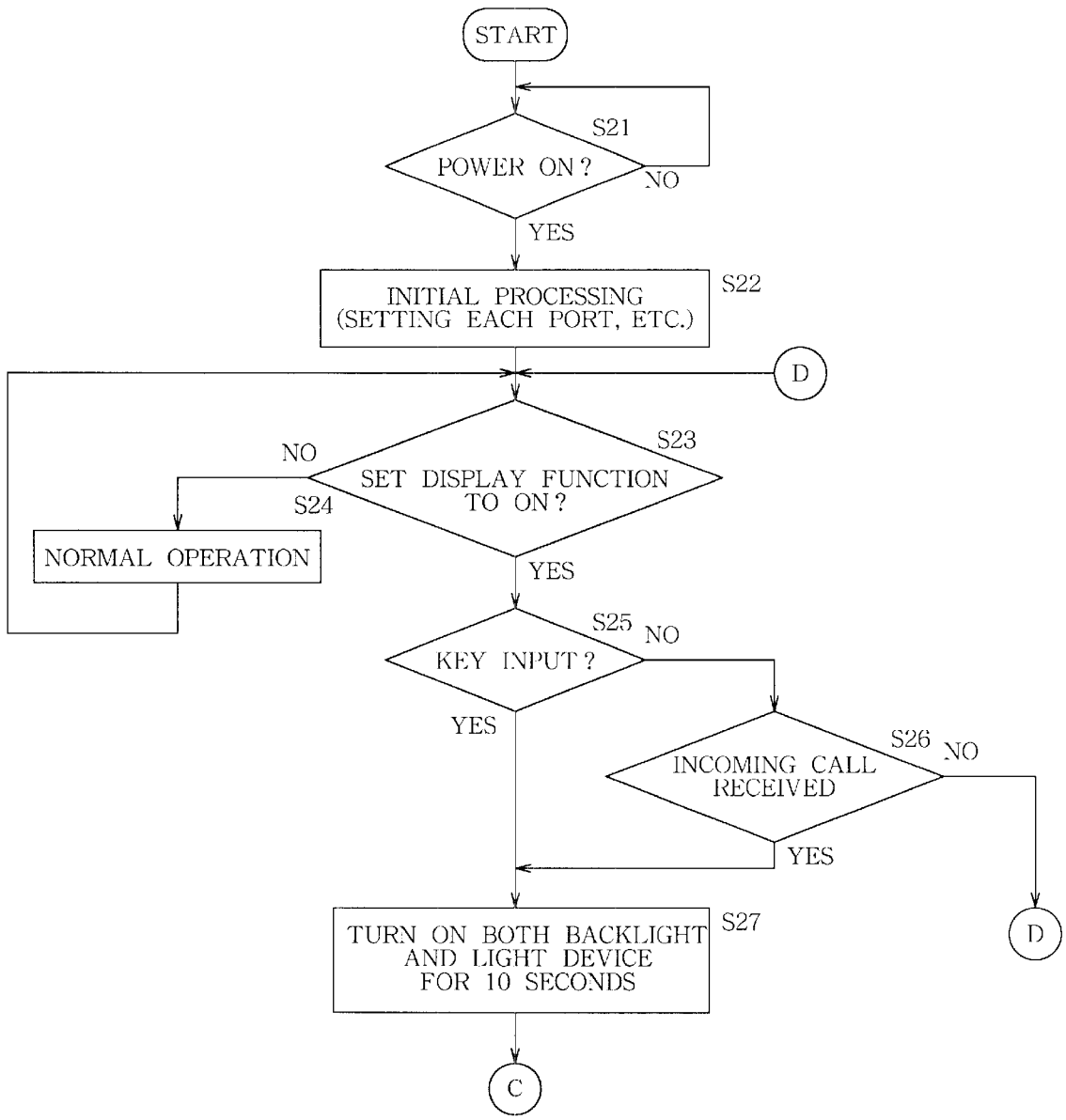
FIG. 6 is a flow chart showing the first half of LCD display ON/OFF procedure with the portable telephone of the second embodiment.
Figure 7:
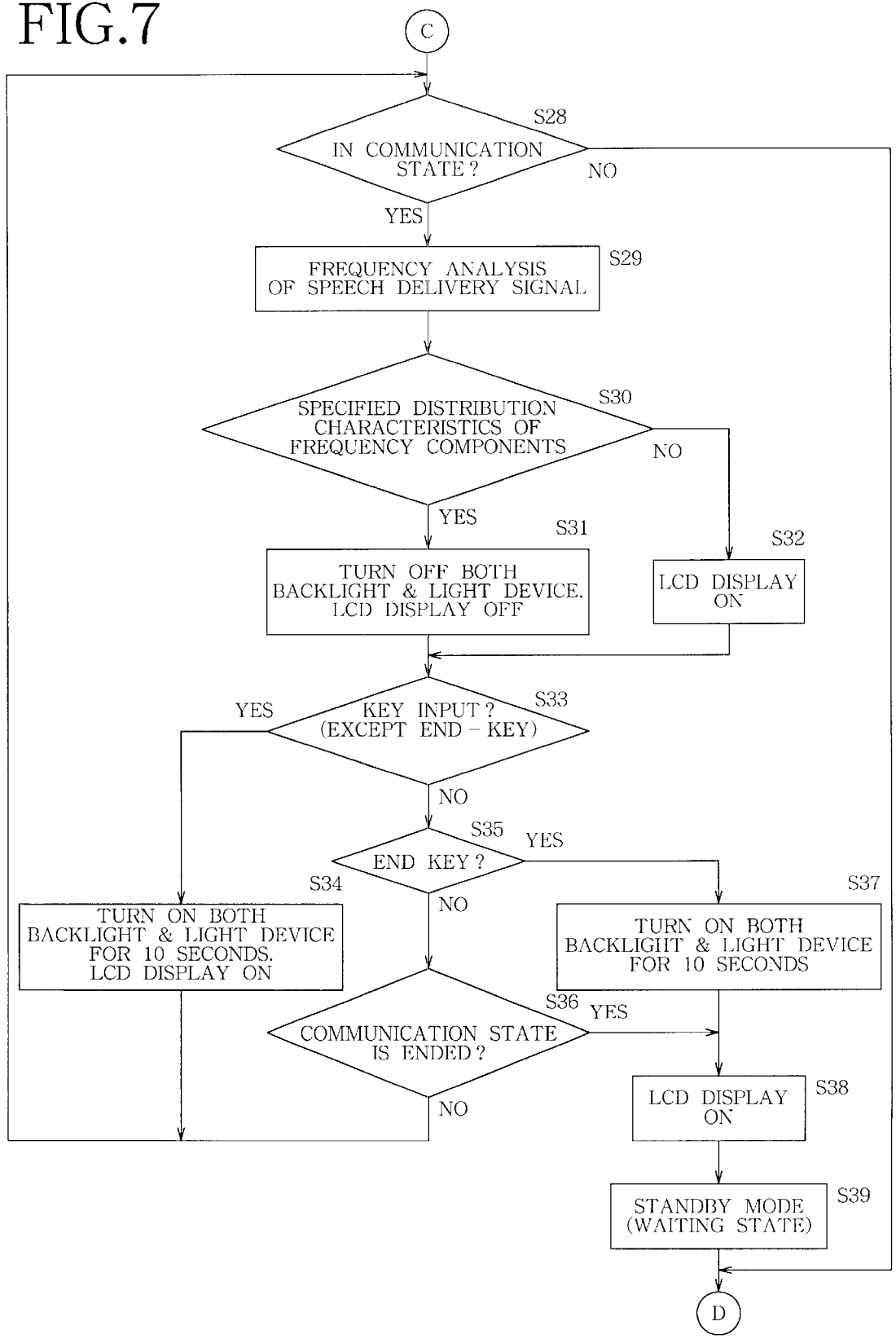
FIG. 7 is a flow chart showing the second half of the procedure described above.

FIG. 6 and FIG. 7 show LCD display on/off procedure to be executed by the control circuit of the embodiment.

In step S21 as shown in FIG. 6, an inquiry is made as to whether power is turned on. When the answer is negative, step S21 follows again to repeat the same inquiry. On the other hand, when the answer is affirmative, step S22 follows to execute initial processing like setting each port, etc. Subsequently, step S23 inquires whether LCD display ON/OFF function is set to ON. If the answer is negative, step S24 follows to execute normal operation.

On the other hand, when the answer is affirmative in step S23, step S25 follows to inquire whether key input is performed. If the answer is negative, step S26 follows to inquire whether an incoming call is received. When the answer is negative, step S23 follows again to repeat the inquiry whether LCD display ON/OFF function is set to ON.

When the answer to the inquiry in step S25 is affirmative with key input performed, or when the answer to the inquiry in step S26 is affirmative with an incoming call received, step S27 follows to execute operation for staying on both the backlight 19 and the key light device 21 for just 10 seconds.

Next in step S28 as described in FIG. 7, an inquiry is made as to whether the telephone is in a communication state. When the answer is negative, step S23 follows again as described in FIG. 6 to repeat the inquiry whether LCD display ON/OFF function is set to ON.

On the other hand, if the answer is affirmative in step S28 as shown in FIG. 7, then step S29 follows to execute frequency analysis of the speech delivery signal input from the microphone 17. Although the speech delivery signal is an unsteady signal, the speech delivery signal can be considered as a steady signal for so short time as 10 msec. Accordingly, frequency analysis of the speech delivery signal is performed in a cycle of 5 to 20 seconds in 15 to 30 msec.

Thereafter, in step S30 an inquiry is made as to whether the speech delivery signal has specified distribution characteristics of frequency components based on the resulted frequency analysis. Male and female voice signals have distribution characteristics of frequency components as described above, respectively. An inquiry is made as to whether the speech delivery signal is a voice signal according to the answer to whether the speech delivery signal has great frequency components within the range of 0 to 1.5 kHz, or to whether the speech delivery signal has great frequency components within the range of 0 to 2.5 kHz.

If the answer is affirmative in step S30, step S31 follows to turn off both the backlight 19 and the key light device 21, and to set display operation of the LCD 18 to OFF, and thereafter to be followed by step S33. On the other hand, if the answer is negative in step S30, step S32 follows to set display operation of the LCD 18 to ON, and thereafter to be followed by step S33.

In step S33, an inquiry is made as to whether key input is performed by a manual key except an end-key. When the answer is affirmative, step S34 follows to perform operation for turning on both the backlight 19 and the key light device 21 for just 10 seconds and to set display operation of the LCD 18 to ON. Step S28, then, follows again to repeat the inquiry as to whether the telephone is in a communication state.

When the answer is negative in step S33, step S35 follows to inquire whether the end-key is manipulated. If the answer is negative, step S36 follows to inquire whether the communication is ended. If the answer is negative in step S36, step S28 follows again to inquire whether the telephone is in a communication state. If the answer is affirmative in step S36, followed by step S38.

If the answer is affirmative in step S35 with the end-key manipulated, step S37 follows to perform operation for lighting both the backlight 19 and the key light device 21 for just 10 seconds and then step S38 follows.

In step S38, display operation of the LCD 18 is set to ON. Subsequently, in step S39, the telephone is set to a standby mode or an incoming call waiting state, and then step S23 as described in FIG. 6 follows again.

When the user speaks with the portable telephone of the embodiment kept over the user's ear while the telephone is in a communication state, the answer to step S30 is affirmative as described in FIG. 7 to turn off both the backlight 19 and the key light device 21, setting display operation of the LCD 18 to OFF.

On the other hand, when the user keeps the telephone off the user's ear, the answer to the inquiry in step S30 is negative to set display operation of the LCD 18 to ON.

If the user manipulates a manual key except the end-key while the telephone is in a communication state, the answer to the inquiry in step S33 is affirmative to turn on both the backlight 19 and the key light device 21, setting display operation of the LCD 18 to ON.

If the user manipulates the end-key while the telephone is in a communication state, the answer to the inquiry in step S35 is affirmative to turn on both the backlight 19 and the key light device 21, setting display operation of the LCD 18 to ON. Thereafter, the telephone is set in a standby mode.

Further, in the case where a caller with whom the user is talking manipulates to complete the communication while a user does not manipulate the end-key, the answer to the inquiry in step S36 is affirmative, to set display operation of the LCD 18 to ON, thereafter setting the telephone in a standby mode.

With the portable telephone of the embodiment, when the user speaks with the telephone kept off the user's ear, display operation of the LCD 18 is caused to be set to OFF, and both the backlight 19 and the key light device 21 are forced to be turned off to reduce more useless power consumption than with the conventional portable telephone.

The embodiments described above are intended to illustrate the present invention and should not be construed as restricting the invention defined in the appended claims or reducing the scope thereof. Further the devices of the invention are not limited to those of the foregoing embodiments in construction but can of course be modified variously without departing from the spirit of the invention as set forth in the claims.

For example, the present invention is applicable also to a foldable portable telephone having a casing which comprises a main body case and a closure case openably connected to the main body case.

According to the first embodiment described, an inquiry is made as to whether the speech delivery signal is a voice signal based on the sound pressure value of the speech delivery signal, whereas the construction is not limited to the above; the inquiry can also be made based on a waveform amplitude value of the speech delivery signal.

According to the first and second embodiments, display operation of the LCD 18 is ON/OFF-controlled based on the speech delivery signal input from the microphone as shown in FIG. 1, whereas the construction is not limited to the above; display operation of the LCD 18 can also be ON/OFF-controlled based on a speech receiving signal supplied to the speaker 16, or display operation of the LCD 18 can also be ON/OFF-controlled based on both the speech delivery signal input from the microphone 17 and the speech receiving signal supplied to the speaker 16.

Further, according to the first and the second embodiments, as shown in FIG. 3 and FIG. 7, if the speech delivery signal is not a voice signal, only display operation of the LCD 18 is set to ON, whereas the construction is not limited to the above; if the speech delivery signal is not a voice signal, display operation of the LCD 18 is set to ON and both the backlight 19 and the key light device 21 are caused to be turned on. According to this construction, when the user keeps the telephone off the user's ear while making or receiving a call, the screen of the LCD 18 can be seen clearly.

What is claimed is:

1. A portable telephone having a portable casing which is provided with a microphone for speech delivery, a speaker for speech receiving, a display for showing information, and a control circuit for controlling display operation, the control circuit comprising:

checking means for checking whether a speech delivery signal input from the microphone and/or a speech receiving signal to be fed to the speaker are voice signals based on a sound pressure value or a waveform amplitude value of the speech delivery signal and/or the speech receiving signal, and display on/off control means for setting display operation of the display to OFF when the signal is found to be a voice signal, while setting display operation of the display to ON when the signal is not found to be a voice signal.

2. A portable telephone having a portable casing which is provided with a microphone for speech delivery, a speaker for speech receiving, a display for showing information, an information input device having a manipulation surface disposed on a surface of the casing, a light device for lighting a screen of the display and/or a manipulation surface of the information input device, and a control circuit for controlling display operation and light operation, the control circuit comprising:

checking means for checking whether a speech delivery signal input from the microphone and/or a speech receiving signal to be fed to the speaker are voice signals, and display on/off control means for setting display operation of the display to OFF when the signal is found to be a voice signal, while setting display operation of the display to ON when the signal is not found to be a voice signal, and light control means for turning off the light device when the signal is found to be a voice signal.

3. A portable telephone according to claim 1 wherein the checking means of the control circuit comprises:

storing means for storing a reference value of a sound pressure value or a waveform amplitude value of the voice signal used for checking whether the speech delivery signal input from the microphone and/or the speech receiving signal to be fed to the speaker are voice signals, detecting means for detecting the sound pressure value or the waveform amplitude value of the speech delivery signal input from the microphone and/or the speech receiving signal to be fed to the speaker, and signal checking means for checking whether the speech delivery signal and/or the speech receiving signal are voice signals by comparing the reference value stored in the storing means with the sound pressure value or the waveform amplitude value detected according to the detecting means.

4. A portable telephone according to claim 3 wherein when the sound pressure value or the waveform amplitude value detected by the detecting means is continuously or intermittently greater than the reference value described for a longer period of time than a specified period of time, the signal checking means of the checking means checks whether the speech delivery signal and/or the speech receiving signal are voice signals.

5. A portable telephone having a portable casing which is provided with a microphone for speech delivery, a speaker for speech receiving, a display for showing information, and a control circuit for controlling display operation, the control circuit comprising:

signal analysis means for performing frequency analysis of a speech delivery signal input from the microphone and/or the speech receiving signal to be fed to the speaker, signal checking means for checking whether the speech delivery signal and/or the speech receiving signal are voice signals based on the resulted analysis according to the signal analysis means, and display on/off control means for setting display operation of the display to OFF when the signal is found to be a voice signal, while setting display operation of the display to ON when the signal is not found to be a voice signal.

6. A portable telephone having a portable casing which is provided with a microphone for speech delivery, a speaker for speech receiving, a display for showing information, an information input device having a manipulation surface disposed on a surface of the casing, and a control circuit for controlling display operation, the control circuit comprising:

checking means for checking whether a speech delivery signal input from the microphone and/or a speech receiving signal to be fed to the speaker are voice signals, and display on/off control means for setting display operation of the display to OFF when the signal is found to be a voice signal, while setting display operation of the display to ON when the signal is not found to be a voice signal and a user manipulates one key of a plurality of manual keys comprised in the information input device, wherein the one key is not an end-key to be manipulated for ending the communication.

* * * * *